Patented Feb. 9, 1937

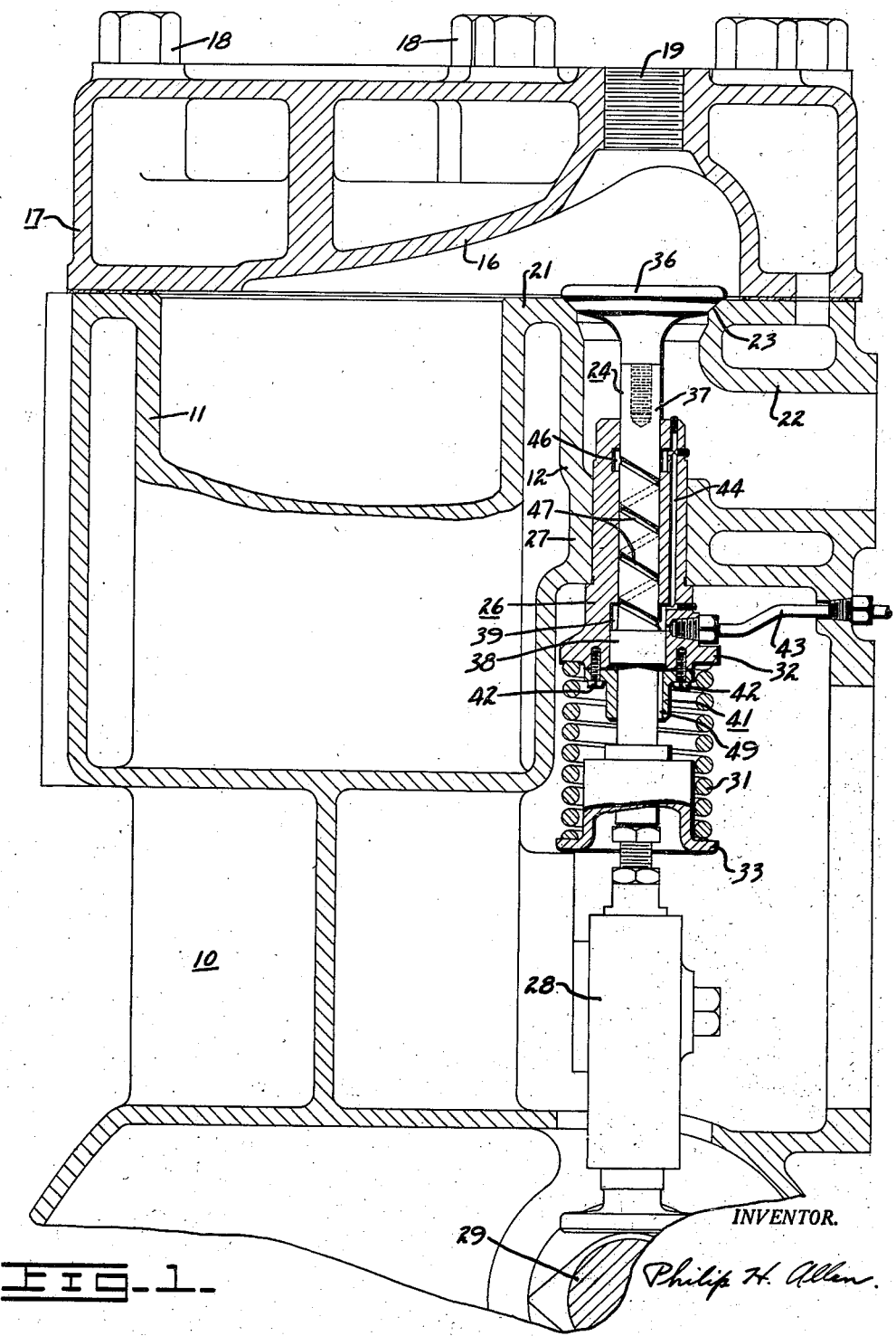

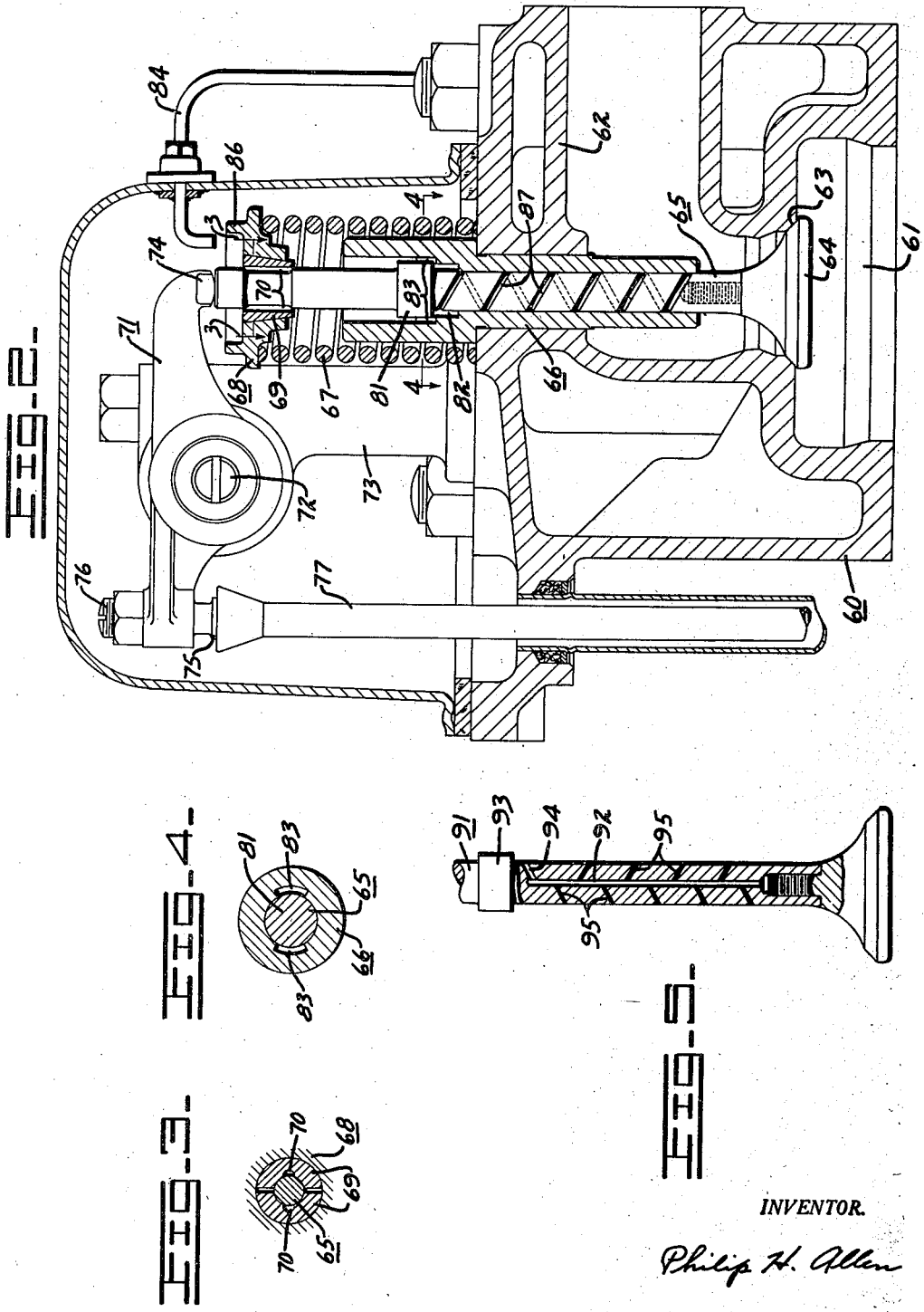

2,069,745

UNITED STATES PATENT OFFICE 2,069,745

ENGINE

Philip H. Allen, San Leandro, Calif.

Application February 20, 1933, Serial No. 657,612

12 Claims. (Cl. 184—6)

The present invention relates to internal combustion engines and more particularly to the provision of lubricating means for the valves thereof. In known forms of engines either no provision is made for lubricating the valves in their guides or a special lubricant is introduced to the combustion chamber through the intake manifold. This method of valve lubrication has proven unsatisfactory as it does not positively force lubricant to the bearing surfaces of the valves and guides and hence does not prevent sticking of the valves and the consequent interference with engine performance. The addition of lubricant to the fuel mixture not only interferes with proper combustion and leaves undesirable by-products of combustion in the chamber, but also requires the provision of an additional lubricant reservoir and lubricant lines exteriorly of the engine.

The present invention eliminates the above disadvantages by the provision of force-feed lubrication for the valves whereby lubricant is forced by pressure to the entire bearing surfaces of the valve stems and the valve guides.

It is an object of the invention to provide pressure lubrication for the valves of an internal combustion engine.

Another object of the invention is the provision of means operated by the valves of an internal combustion engine for lubricating the bearing surfaces of the valves and the guides.

Another object of the invention is the provision of valve lubricating means of simple construction which can be installed readily in assembled internal combustion engines.

Another object of the invention is to provide a lubricating pump operated by the camshaft of an internal combustion engine for supplying lubricant to the valves thereof.

Another object of the invention is to provide an internal combustion engine including a reciprocable member and means operated thereby for lubricating the bearing surfaces thereof.

Another object of the invention is to provide lubricating means for the valves of an internal combustion engine including a lubricant conduit formed integrally a valve and valve guide of an internal combustion engine.

Another object of the invention is to provide a valve comprising a valve stem and valve proper detachably secured to said valve stem.

Other objects will appear as the description progresses.

Description of figures

Figure 1 is partial vertical, transverse section of one type of internal combustion engine embodying the instant invention.

Figures 2-4 illustrate a second type of internal combustion engine embodying the instant invention.

Figure 2 is a vertical, transverse section through the cylinder head.

Figure 3 is a detail section taken on the line 3—3 in Figure 2.

Figure 4 is a detail section taken on the line 4—4 in Figure 2.

Figure 5 is a detail view, partly in section, of a second form of valve stem constructed according to the present invention.

Description of mechanism

The invention is illustrated in Figure 1 as applied to the L-head type of internal combustion engine, which includes body portion or block 10 having a plurality of cylinders each formed by a wall 11. Each cylinder is surrounded by a suitable water chamber formed in part by internal wall 12 of the block. Opening into the cylinder is a combustion chamber formed by internal wall 16 of cylinder head 17, which is suitably secured to block 10 by studs 18. Threaded aperture 19 in head 17 provides a station for mounting suitable spark ignition means.

The combustion chamber extends over upper wall 21 of block 10 which has a pair of aligned openings forming valve ports. The fuel mixture is admitted and exhaust gases are expelled from the combustion chamber through similar intake and exhaust passages formed in the block, under control of similar valves, mounted in the block and engaging valve-seats formed around the ports. As the intake and exhaust passages and valves are similar, only one passage and valve will be described.

Conduit 22, formed in part by wall 12, leads from an opening in the side of block 10 to valve seat 23 engaged by valve 24. Said valve 24 is reciprocated in guide 26, mounted in boss 27 in block 10, by valve lifter 28 and camshaft 29. Spring 31 compressed between flange 32 of guide 26 and collar 33 on valve 24 urges the valve to closed position, and causes lifter 28 to follow the cam on the camshaft.

The valve comprises a stem and a valve proper which can be assembled or disassembled readily to facilitate original assembly and repairs. Said valve 24 includes valve proper 36 and valve stem 37, formed for threaded engagement. In assembly, stem 37 is inserted through guide 26, after which valve proper 36 is threaded into said stem.

Means are provided for lubricating the bearing surfaces of the valve stem and the guide therefor by pressure derived from a pump operated by the engine. Valve stem 37 has integral piston 38 which is received in lubricant chamber 39 in guide 26. The chamber is closed at the bottom by cover 41 secured to guide 26 by screws 42.

Lubricant is supplied to chamber 39 through a lubricant inlet passage opening into said chamber, and lubricant line 43, which is preferably connected to a suitable lubricant pump in the crankcase of the engine. Vertical passage 44 leads from lower lubricant chamber 39 to upper lubricant chamber 46 formed in guide 26 adjacent the upper end thereof. Valve stem 37 has spiral groove 47 formed therein to feed a constant supply of lubricant from upper chamber 46 to the bearing surfaces of guide 26 and valve stem 37.

As valve stem 37 moves upwardly, piston 38 closes the lubricant inlet passage and thereafter forces the lubricant in lower chamber 39 through passage 46 and spiral groove 47 into upper chamber 46. During the return movement of valve stem 37, the lubricant is free to return to lower chamber 39 through said groove 47. Passage 49 in cover 41 provides for ingress and egress of air into chamber 39 below piston 38.

Thus it is seen that lubricant is supplied constantly to the bearing surfaces of the valve and guide by pressure derived from a pump formed integrally therewith. It is to be noted also that the valve stem is provided with integral means for conducting lubricant to the bearing surfaces thereof.

Figures 2–4 illustrate the invention as applied to the valve-in-head type of internal combustion engine. The engine includes a body portion or cylinder head 60 having combustion chamber 61 formed therein and adapted to be mounted on a suitable cylinder block (not shown). Similar intake and exhaust passages lead to chamber 61, and are controlled by similar valves, but, for the sake of brevity, only one passage and valve are shown and described. The passage is formed by wall 62 of head 60 and terminates in valve seat 63 which is engaged by valve proper 64, having threaded engagement with valve stem 65. Valve proper 64 and valve stem 65 are similar to valve proper 36 and valve stem 37 heretofore described.

The valve is mounted in guide or bushing 66 having a shoulder engaging the upper surface of head 60, and is urged to closed position by spring 67 compressed between head 60 and retainer 68 secured to the upper end of stem 65 by locks 69 (Figs. 2 and 3).

The valve is operated by rocker arm 71 mounted on shaft 72 in bracket 73, which is mounted on the head. At one end rocker arm 71 has nose 74 engaging the upper end of stem 65 and at the other end has adjusting screw 76 mounted therein. Said screw has a ball and socket connection 75 with push rod 77. Push rod 77 is operated from the camshaft (not shown) of the engine.

The pressure lubrication means in this form of the invention includes piston 81 which is received in chamber 82 in guide 66. The walls of chamber 82 are recessed at a plurality of points as at 83 (Figs. 2 and 4) to provide passages for the lubricant leading by piston 81 to chamber 82. In its raised position, Figure 2, the lower edge of piston 81 is above the lower edges of said recesses 83.

Lubricant is supplied to chamber 82 from lubricant line 84 which discharges the lubricant into a receptacle provided by vertical flange 86 of retainer 68. The lubricant drains from retainer 68 through the spaces between locks 69 (Figs. 2 and 3) and internal vertical grooves 70 formed therein, along stem 65 into chamber 82. Upon downward movement of the valve, piston 81 forces the lubricant from chamber 82 through spiral groove 87 to the bearing surfaces of the valve stem and the guide.

It is to be noted that in both forms of the invention, the bearing surfaces of the valve and its guide are lubricated by pressure from a pump which includes means integral with the valve and the guide, and which is operated by power from the engine.

Figure 5 illustrates a modified form of valve in which valve stem 91 is provided with central longitudinal passage 92. Piston 93 reciprocating in chamber 82 forces the lubricant through upper inclined passage 94 into passage 92 from which it is conducted by a plurality of inclined passages 95 leading at spaced points from central passage 92 to the bearing surfaces of the valve and the guide.

It is to be noted that in both forms of valves disclosed herein, the valve stem is provided with integral means comprising a lubricant conduit for transmitting lubricant to the bearing surfaces thereof. Either form of valve is adapted for use with the valve lubricating pump disclosed herein, to conduct lubricant therefrom to the bearing surfaces of the valve and its guide. In addition each form of valve includes a valve stem and a valve proper detachably secured to the stem whereby the valve proper can be removed easily for grinding or replacement.

I, therefore, claim as my invention:

1. In an internal combustion engine having a combustion chamber, a body portion, a passage formed in said body portion communicating with said chamber, a valve guide seated in said body portion having a pump chamber formed therein, a valve mounted in said guide comprising a valve proper and a valve stem having threaded engagement, said valve proper being adapted to open and close said passage, said valve stem having a pump piston thereon adapted to operate in said pump chamber and being adapted to be inserted through said guide in assembly, after which the valve proper is attached thereto, means for supplying lubricant to said pump chamber, and means integral with said valve stem for conducting lubricant from said pump chamber to the bearing surfaces of said valve stem and said guide, said pump piston serving to force lubricant through said integral means as said valve reciprocates in opening and closing said passage.

2. In an internal combustion engine, a body portion, a valve guide mounted in said body portion, a valve mounted in said guide, and a lubricant pump operated by said valve for forcing lubricant to the bearing surfaces of said valve and said guide.

3. In an internal combustion engine, a camshaft, a guide, a valve mounted for reciprocation in said guide and means for supplying lubricant to the bearing surfaces of said valve and said guide, including a lubricant pump formed integrally with said valve and said guide.

4. The combination with a body portion of an internal combustion engine and a camshaft, of a valve guide mounted in said body portion, a pump chamber formed in said guide, a valve mounted in said guide, a piston on said valve and adapted to reciprocate in said chamber, means for supplying lubricant to said chamber, and means operated by said camshaft for reciprocating said valve to operate said pump, whereby said pump forces lubricant to the bearing surfaces of said valve and said guide.

5. In an internal combustion engine, a valve guide, a valve, including a valve stem, and a valve proper detachably secured thereto, a pump piston on said stem, a pump chamber in said guide, and an integral conduit on said stem leading from said chamber to the bearing surfaces of said stem and said guide to conduct lubricant thereto.

6. In an internal combustion engine, a valve guide, a pump chamber formed therein, a valve mounted in said guide, including a valve stem mounted in said guide, a pump piston on said stem in said chamber, said piston being adapted to be inserted through said guide in assembly, and a valve proper detachably secured to said stem whereby said valve proper is adapted to be attached to said stem after said stem is positioned in said guide.

7. In an internal combustion engine, a valve, said valve having a stem integrally formed to force and conduct lubricant to the bearing surfaces of said valve.

8. In an internal combustion engine, a valve, a pump piston integrally formed on said valve, and a lubricant conduit formed integrally in said valve and leading from an inlet adjacent said piston to the bearing surfaces of said valve.

9. The combination with a valve guide having a lubricant pump chamber formed therein, of a valve mounted in said guide and having a pump piston adapted to reciprocate in said chamber.

10. The combination with a valve guide of an internal combustion engine, and a valve mounted therein, of means controlled by said valve for supplying lubricant to the bearing surfaces of said valve and said guide.

11. In an internal combustion engine, a body portion, a valve guide mounted in said body portion, a valve mounted in said guide, and a lubricant pump controlled by said valve for forcing lubricant to the bearing surfaces of said valve and said guide.

12. In an internal combustion engine, a valve movably mounted on said engine for controlling a passage communicating with a combustion chamber of said engine, and means for supplying lubricant to the bearing surfaces of said valve including pump means movable with said valve, said valve and said pump means mounted for assembly and disassembly as a unit.

PHILIP H. ALLEN.